US006614200B2

United States Patent
Fowler et al.

(10) Patent No.: US 6,614,200 B2
(45) Date of Patent: Sep. 2, 2003

(54) AC MOTORS FOR DRIVING VEHICLE CLOSURES

(75) Inventors: Craig Rae Fowler, Caen (FR); Dennis A. Kramer, Troy, MI (US); Jerome Quere, Bieville-Beuville (FR); Enrico Fin, Lake Orion, MI (US); George Chene, Sterling Heights, MI (US); Stephen Chiu, Thousand Oaks, CA (US); Pascal Garrido, Kilworthy (CA); Ira B. Goldberg, Thousand Oaks, CA (US); Charles Hopson, Lebanon, TN (US); David M. Barry, Stratford Upon Avon (GB); Dan Rogovin, Newbury Park, CA (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 31 days.

(21) Appl. No.: 09/833,164

(22) Filed: Apr. 11, 2001

(65) Prior Publication Data

US 2002/0149333 A1 Oct. 17, 2002

(51) Int. Cl.[7] ................................................ G05B 5/00
(52) U.S. Cl. ...................... 318/445; 318/287; 318/286; 318/280; 318/469; 318/461; 318/266
(58) Field of Search ................................. 318/445, 287, 318/286, 280, 469, 430, 434, 461, 468, 268, 266

(56) References Cited

U.S. PATENT DOCUMENTS 4,641,067 A  *  2/1987   Iizawa et al. ............... 318/287
5,250,765 A  *  10/1993  Mizuno et al. ............. 318/254
6,278,249 B1 *  8/2001   Fitzgibbon et al. ......... 318/468

* cited by examiner

Primary Examiner—Karen Masih
(74) Attorney, Agent, or Firm—Carlson, Gaskey & Olds

(57) ABSTRACT

An AC motor is utilized to drive a closure on a vehicle. The use of the AC motor provides valuable benefits with regard to cost and size. Further, a three-phase AC motor may be utilized, and the pulses in its power supply monitored to determine an obstruction in the path of the closure. Frequency control may also be utilized to provide optimum control of the drive of the component at both start-up and stop.

18 Claims, 2 Drawing Sheets

AC MOTORS FOR DRIVING VEHICLE CLOSURES

BACKGROUND OF THE INVENTION

This invention relates to the use of an alternating current motor for driving a vehicle closure, and further to control improvements for such systems.

Vehicles have typically included components which are driven by DC motors. This is because the power supply on most vehicles is DC. AC motors have some desirable benefits when utilized in a vehicle application.

More recently, increased voltage batteries are being proposed for vehicles. With an increased voltage, the use of AC motors becomes more practical on a vehicle.

One type of vehicle component which has typically been driven by a DC motor is a vehicle closure. Vehicle closures include windows, sun roofs, moon roofs, etc. Generally, a glass panel is moved within a frame between an open and closed position. One problem with such closures is that occasionally an obstruction will be found in the path of the closure. The obstruction can be created by a passenger's arm, etc. Upon a closure contacting such an obstruction, it would be desirable that the motor stop or reverse. Complex controls have been developed for identifying such an obstruction.

Moreover, another problem with vehicle component drives is that it would be desirable to utilize a motor which is as small as possible. However, during certain periods of time, higher torque is necessary.

SUMMARY OF THE INVENTION

In a disclosed embodiment of this invention, an AC motor is utilized to drive a vehicle closure between open and closed positions. The closure may be a window, a sun roof, a moon roof, etc. The motor is connected through appropriate controls to drive the closure.

In a second feature of this invention, the motor is preferably a three-phase powered motor. The timing of the phase waves is monitored. When driving a closure member to a closed position, occasionally an object, such as a passenger's arm, may be in the path of the closure. Thus, vehicle designers attempt to identify such objects, and stop operation of the motor if an object is detected. The present invention discloses a control for detecting an object by monitoring the phase spacing between the three-phase power supply. By looking at peaks across the three-phases, and the time spacing between those peaks, a control can identify the presence of an obstruction. When an obstruction is detected, then the control can stop or reverse the motor.

In a further feature of this invention, some way of determining the position of the closure is also utilized. Preferably, a position sensor, or a counter for counting the number of peaks can be utilized such that the control has a reliable feedback of the actual position of the closure. As closure movement begins, and as it approaches an end of travel, one embodiment of this invention varies the frequency to control the speed of the closure. Thus, the closure slows as it approaches an end-of-travel position. Further, the frequency is controlled to provide start-up characteristics which are most desirable. This aspect of the invention can also be utilized for other vehicle components such as a motor for driving a seat, etc.

These and other features of the present invention can be best understood from the following specification and drawings, the following which is a brief description.

DETAILED DESCRIPTION OF A PREFERRED EMBODIMENT

Figure 1:
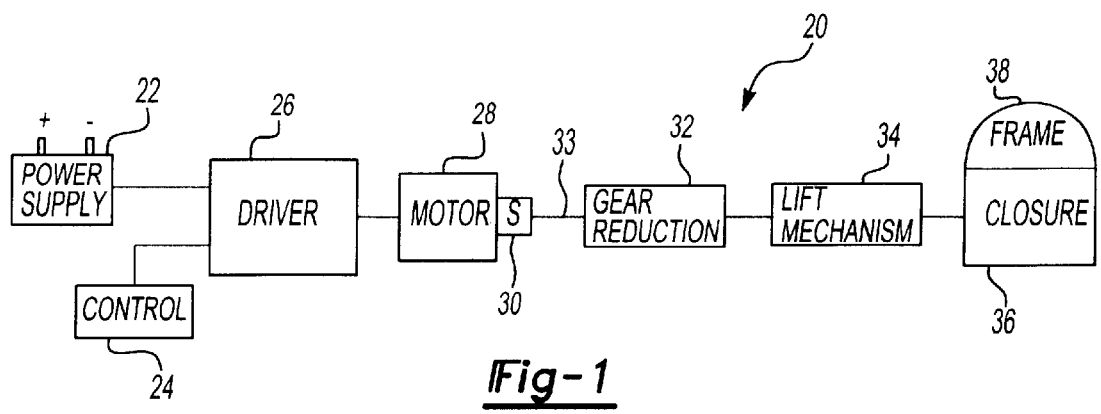
FIG. 1 is a schematic view of a system incorporating the present invention.

A system 20 is illustrated in FIG. 1 incorporating a battery power supply 22 and a control 24. A driver 26 receives power from the battery 22 and converts the battery-supplied power to an alternating current. The alternating current can be single-phase or three-phase, and is provided to an appropriate single-phase or three-phase AC motor 28. A position sensor 30 senses the position of the rotating shaft from the motor 28, and the position sensor can then be utilized to identify the position of a vehicle closure 36 which is driven by the motor 28. A gear reduction 32 may be driven by the shaft 33 of the motor. The gear reduction 32 in turn drives a mechanism 34, which may be as known, and which is operable to move the vehicle closure 36 within its frame 38. The mechanical details of this mechanism are as known. What is inventive in this system is the use of an AC motor for driving a closure 36 on a vehicle. The closure may be a window, a sun roof, a moon roof, etc.

Figure 2A:
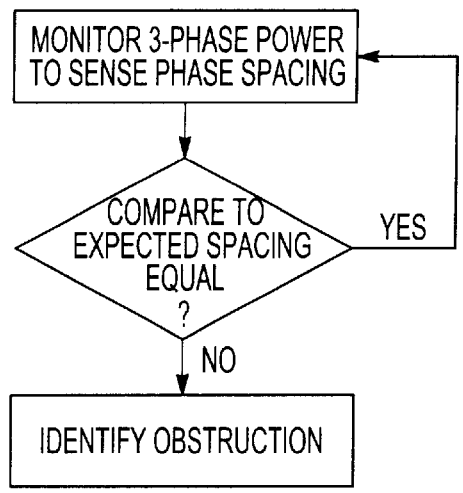
FIG. 2A is a control flow chart for one aspect of this invention.

FIG. 2A shows a further control detail for sensing an obstruction in the path of the closure 36. If a three-phase motor 28 is utilized, the spacing between the peaks in the phases is monitored. If the time spacing between the peaks is not as expected, then the control determines that an obstruction may be in the path of the closure. At that time, the motor may be stopped or reversed.

Figure 2B:
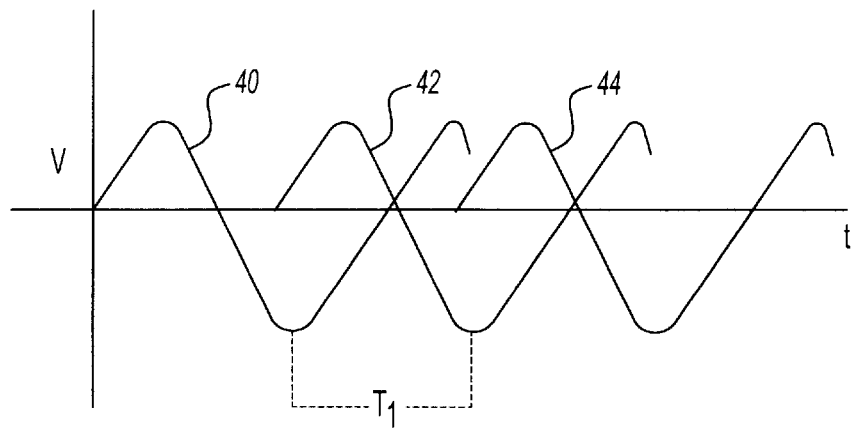
FIG. 2B shows a physical characteristic of two power signals with and without an obstruction in the path of a closure.

FIG. 2B shows the three-phase power supply graphs 40, 42 and 44. As shown, the peaks are spaced by a time $T_1$. If an obstruction is in the way of the closure 36, the peaks between the waves 40, 42 and 44 will be spaced by a different time. When the control senses the sensed time differs from the expected time $T_1$, then a determination can be made that an obstruction is in the path of the window. The motor may then be stopped or reversed. The peaks 40, 42 and 44 can also be counted to determine the position of the closure 36. Knowing the position of the closure can then be utilized to control start-up and stopping characteristics.

Figure 3A:
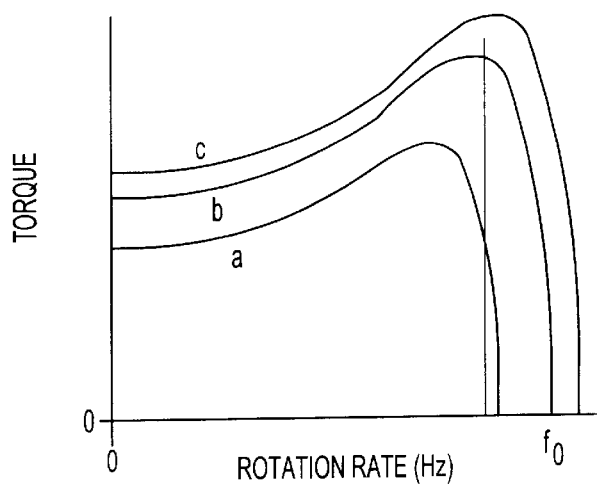
FIG. 3A shows motor characteristics.

FIG. 3A shows a graph of torque versus rate of rotation for various frequencies. The three graphs a, b and c represent three motors which operate at three different frequencies. Curve b represents a motor operating at a base frequency $f_0$. Curve a represents the same motor operating at a smaller frequency than $f_0$. Curve c represents a motor operating at a frequency greater than $f_0$. As can be seen, there is significant torque at zero rpm. Torque increases as rotor speed increases until a maximum torque is reached. Maximum torque preferably occurs as a normal rate of rotation. As lower frequency is used to operate the motor torque decreases, but the maximum torque occurs at a lower rate of rotation. These aspects can be utilized and applied to the control of AC motors for vehicles. High torque is desirable for starting, and thus, a variable frequency source is utilized, and the drive frequency is increased to increase torque at start-up. This will ensure rapid start for movement of the closure. As the rotor accelerates, the frequency is reduced to a desired speed. As the closure approaches a stopping position, the operating frequency is decreased. This has several advantages. First, the energy and momentum of the moving parts is not dissipated by structures such as brakes, etc. This will increase the useful life of the system. This aspect is particularly applicable to closures, but would also have benefits in seats. The control provides position sensors, either direct such as the position sensor on the motor, or indirect such as by counting pulses.

Figure 3B:
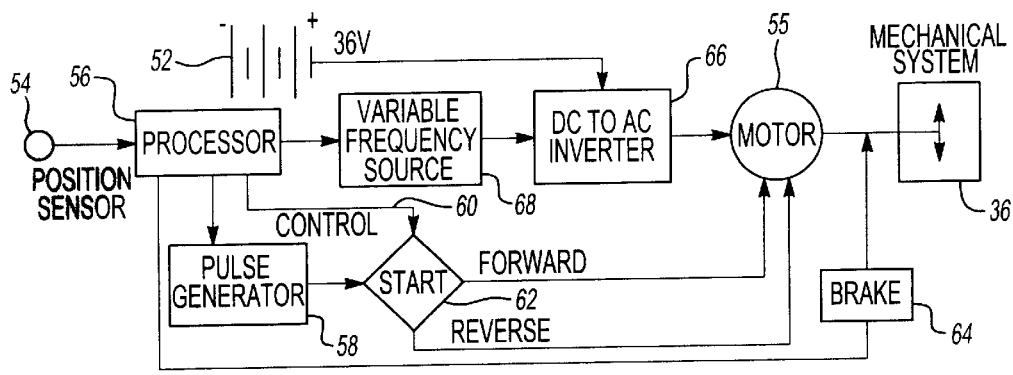
FIG. 3B shows another embodiment of this invention.

FIG. 3B shows a system for utilizing the above control for single phase motors. Battery 52 and a position sensor 54 are components of the system. Position sensor 54 is sensing the position of a closure 36. While the control features are disclosed for driving a closure, it should be understood that the features would also be applicable to seats or other vehicle components. A processor 56 controls the system. A pulse generator 58 is utilized to create pulses for controlling a motor 55. Processor 56 further sends control signal 60 to a starter 62. Starter 62 can drive the motor 55 either in a forward or reverse direction. A brake 64 is also utilized as known for controlling the closure 36. A DC to AC inverter receives a power signal from a variable frequency source 68. Thus, the direct voltage from the battery 52 is converted to alternating current and sent to the motor 55. At start-up, the variable frequency source increases the frequency of the power supply to motor 55, thus increasing the start-up torque. On the other hand, as the position sensor 54 sends signals to processor 56 that an end-of-travel position is being reached, then the variable frequency source reduces the frequency and provides the benefits as outlined above. It should be understood that the closure 36 may be stopped as it nears the full closed position, or if the closure is only being partially closed, then it is approaching a position where the operator would like the closure to stop.

Figure 4:
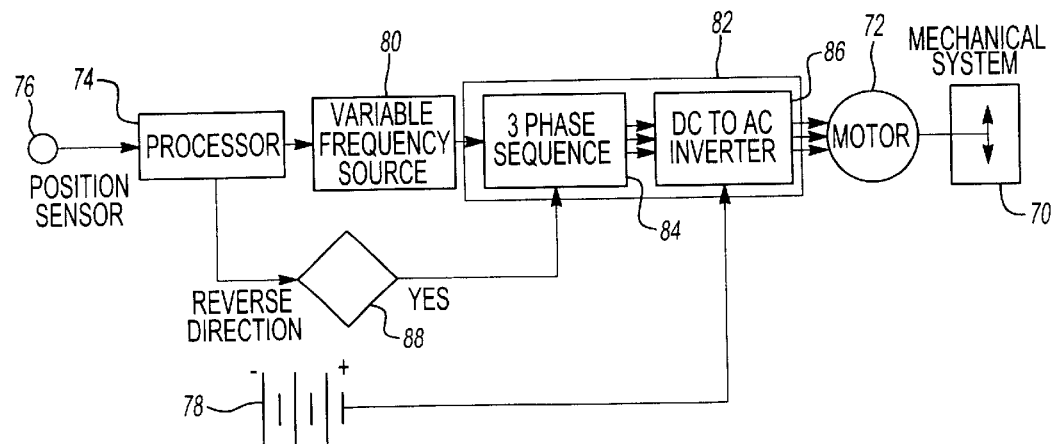
FIG. 4 shows yet another embodiment.

FIG. 4 shows another embodiment for a motor having a three-phase power supply. Again, the closure 70 is driven by a motor 72. Processor 74 receives signals from a position sensor 76. The battery 78 supplies voltage to a DC to AC inverter 86. The power control 82 also includes a three-phase sequence component 84. A starter 88 provides a reverse direction of rotation signal, and controls component 84 based upon a signal from the processor 74. A variable frequency source 80 operates as in the above embodiment.

The embodiments of FIG. 3B or 4 are operable to increase frequency at start-up and decrease frequency at end of travel. Thus, the present invention provides benefits for the use of AC motors in vehicle components, and in particular for driving closures in vehicles.

Preferred embodiments of this invention have been disclosed, however, a worker in this art would recognize that certain modifications would come within the scope of this invention. For that reason, the following claims should be studied to determine the true scope and content of this invention.

What is claimed is:

1. A vehicle closure system comprising:
    a closure moveable between open and closed positions on a vehicle frame;
    an AC motor for driving said closure wherein said motor receives a three-phase power supply; and
    a control that monitors an aspect of said motor to determine the presence of an obstruction wherein said control counts pulses of said three-phase power supply to determine the position of said closure.

2. A system as recited in claim 1, wherein said closure is a sun roof.

3. A system as recited in claim 1, wherein said closure is a window.

4. A vehicle closure system comprising:
    a closure moveable between open and closed positions on a vehicle frame;
    an AC motor for driving said closure wherein said motor receives a three-phase power supply; and
    a control that monitors an aspect of said motor to determine the presence of an obstruction wherein the spacing between pulses of said three-phase power supply is monitored and compared to an expected spacing, and an obstruction is detected when said monitored spacing differs from said expected spacing.

5. A system as recited in claim 1, wherein the power supply for said AC motor is provided with a frequency control.

6. A system as recited in claim 5, wherein said frequency control is utilized at both stop and start of said closure.

7. A system as recited in claim 6, wherein a higher frequency power is supplied to said motor at start-up, and a lower frequency power supply is supplied to said motor as said closure approaches an end-of-travel position.

8. A vehicle component system comprising:
    a vehicle closure;
    an AC motor driving said closure wherein said motor receives a three-phase power supply;
    a control that monitors an aspect of said motor to determine the presence of an obstruction wherein said control counts pulses of said three-phase power supply to determine the position of said closure; and
    a frequency control controlling said motor, said frequency control being operable to provide varying frequency power supply to said motor at least at one of start-up of movement of said component and as said component approaches an end-of-travel position.

9. A system as recited in claim 8, wherein said frequency control is utilized at both stop and start of movement of said component.

10. A system as recited in claim 9, wherein a higher frequency power is supplied to said motor at start-up, and a lower frequency power supply is supplied to said motor as said component approaches an end-of-travel position.

11. A system as recited in claim 8, wherein said closure is a window.

12. A vehicle component system comprising:
    a vehicle closure;
    an AC motor driving said closure wherein said motor receives a three-phase power supply;
    a control that monitors an aspect of said motor to determine the presence of an obstruction wherein the spacing between pulses of said three-phase power supply is monitored and compared to expected spacing, and an obstruction is detected when said monitored spacing differs from said expected spacing; and
    a frequency control controlling said motor, said frequency control being operable to provide varying frequency power supply to said motor at least at one of start-up of movement of said component and as said component approaches an end-of-travel position.

13. A vehicle closure system comprising:
a closure moveable between open and closed positions on a vehicle frame;
an AC motor for driving said closure;
a power supply including a battery and an inverter to convert direct current generated by said battery into alternating current for said AC motor;
a variable frequency control operable to provide varying frequency power supply for said AC motor via said inverter to control motor torque output; and
a processor that monitors at least one predetermined AC motor characteristic and compares said AC motor characteristic to a predetermined AC motor criteria to determine closure position and detect closure obstructions.

14. A system as recited in claim 13, wherein said variable frequency control increases frequency power supply at a start-up.

15. A system as recited in claim 14, wherein said variable frequency control decreases frequency power supply at an end of travel closure position.

16. A system as recited in claim 15 including a position sensor for sensing closure positions from start-up to end of travel.

17. A system as recited in claim 13, wherein said AC motor is a single phase motor and includes a pulse generator that generates pulses to control said motor.

18. A system as recited in claim 13, wherein said AC motor is a three-phase motor and wherein said AC motor characteristic is monitored spacing between phases and said predetermined AC motor criteria is an expected spacing wherein an obstruction is detected when said monitored spacing differs from said expected spacing.

* * * * *

UNITED STATES PATENT AND TRADEMARK OFFICE
CERTIFICATE OF CORRECTION

PATENT NO.     : 6,614,200 B2
DATED          : September 2, 2003
INVENTOR(S)    : Craig Rae Fowler et al.

It is certified that error appears in the above-identified patent and that said Letters Patent is hereby corrected as shown below:

<u>Title page,</u>
Item [75], Inventors, "Stratford Upon Avon" should be -- Warwickshire --

Signed and Sealed this

Sixteenth Day of December, 2003

JAMES E. ROGAN
*Director of the United States Patent and Trademark Office*